(12) United States Patent
Rearick et al.

(10) Patent No.: US 7,906,199 B2
(45) Date of Patent: Mar. 15, 2011

(54) COLOR HARMONIZATION COATINGS FOR ARTICLES OF MANUFACTURE COMPRISING DIFFERENT SUBSTRATE MATERIALS

(75) Inventors: Brian K. Rearick, Allison Park, PA (US); R. Preston Jones, Mars, PA (US); Deborah E. Hayes, Verona, PA (US); Kevin P. Gallagher, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1644 days.

(21) Appl. No.: 11/020,921

(22) Filed: Dec. 23, 2004

(65) Prior Publication Data
US 2006/0141228 A1    Jun. 29, 2006

(51) Int. Cl.
| | |
|---|---|
| *B41M 5/00* | (2006.01) |
| *B44C 1/17* | (2006.01) |
| *G03G 7/00* | (2006.01) |
| *A43B 13/22* | (2006.01) |
| *A43B 23/16* | (2006.01) |

(52) U.S. Cl. .................................. 428/195.1; 36/98
(58) Field of Classification Search ............... 428/195.1, 428/304.4, 904; 36/30 R, 31, 45, 98, 99, 36/102, 103, 112, 114, 115
See application file for complete search history.

(56) References Cited

U.S. PATENT DOCUMENTS

| | | | |
|---|---|---|---|
| 1,365,261 A * | 1/1921 | Mathes | 36/98 |
| 3,616,170 A * | 10/1971 | Closson, Jr. | 442/76 |
| 3,663,679 A | 5/1972 | Barre et al. | |
| 3,847,608 A * | 11/1974 | Dessauer et al. | 430/352 |
| 3,951,897 A * | 4/1976 | Matsuda et al. | 524/591 |
| 3,952,075 A * | 4/1976 | Nakamura et al. | 558/186 |
| 3,954,899 A | 5/1976 | Chang et al. | |
| 4,154,891 A | 5/1979 | Porter, Jr. et al. | |
| 4,410,668 A | 10/1983 | Piccirilli et al. | |
| 4,419,407 A | 12/1983 | Piccirilli et al. | |
| 5,197,210 A * | 3/1993 | Sink | 36/127 |
| 5,208,132 A * | 5/1993 | Kamada et al. | 430/138 |
| 5,221,788 A | 6/1993 | Goto et al. | |
| 5,258,446 A * | 11/1993 | Enomoto et al. | 524/538 |
| 5,312,865 A | 5/1994 | Hoefer et al. | |
| 5,532,058 A | 7/1996 | Rolando et al. | |
| 5,608,000 A | 3/1997 | Duan et al. | |
| 5,662,966 A | 9/1997 | Kobayashi | |

(Continued)

FOREIGN PATENT DOCUMENTS
EP    1382622 A1    1/2004
(Continued)

OTHER PUBLICATIONS

U.S. Appl. No. 10/871,716, filed Jun. 18, 2004, Rye et al.
(Continued)

*Primary Examiner* — Mark Ruthkosky
*Assistant Examiner* — David J Joy
(74) *Attorney, Agent, or Firm* — Diane R. Meyers

(57) ABSTRACT

Color harmonization is provided for articles of manufacture comprising different substrate materials. A coating composition is selected that can be applied to the different substrate materials while maintaining substantially uniform visual characteristics of the article. The substrates may include flexible materials such as natural leather, synthetic leather, vinyl, foam, textiles and the like. Examples of articles of manufacture include footwear, automotive upholstery and automotive interiors.

42 Claims, 10 Drawing Sheets
(8 of 10 Drawing Sheet(s) Filed in Color)

U.S. PATENT DOCUMENTS

| | | | |
|---|---|---|---|
| 5,699,182 A * | 12/1997 | Alfekri | 359/321 |
| 5,939,491 A | 8/1999 | Wilt et al. | |
| 6,162,891 A | 12/2000 | Wamprecht et al. | |
| 6,265,468 B1 | 7/2001 | Chambers et al. | |
| 6,284,836 B1 | 9/2001 | Hassel et al. | |
| 6,312,782 B1 * | 11/2001 | Goldberg et al. | 428/67 |
| 6,423,816 B1 | 7/2002 | Wamprecht et al. | |
| 6,458,898 B1 | 10/2002 | Wamprecht et al. | |
| 6,555,613 B1 | 4/2003 | Poth et al. | |
| 6,713,131 B2 | 3/2004 | Blackwood et al. | |
| 6,734,273 B2 | 5/2004 | Onder | |
| 2001/0024709 A1 * | 9/2001 | Yoneda et al. | 428/91 |
| 2002/0004345 A1 * | 1/2002 | O'Hare | 442/59 |
| 2002/0078599 A1 * | 6/2002 | Delgorgue et al. | 36/98 |
| 2002/0160203 A1 | 10/2002 | Robertson | |
| 2003/0125416 A1 | 7/2003 | Munro et al. | |
| 2003/0125417 A1 | 7/2003 | Vanier et al. | |
| 2004/0014880 A1 * | 1/2004 | Kuba et al. | 524/589 |
| 2004/0065411 A1 | 4/2004 | Janssen et al. | |
| 2004/0067350 A1 | 4/2004 | Janssen et al. | |
| 2004/0191496 A1 | 9/2004 | Rearick et al. | |
| 2005/0012081 A1 * | 1/2005 | Yasuda et al. | 252/586 |

FOREIGN PATENT DOCUMENTS

| | | |
|---|---|---|
| FR | 2 410 075 | 6/1979 |
| FR | 2410075 A | 6/1979 |
| GB | 2 170 445 | 8/1986 |
| GB | 2170445 A | 8/1986 |
| JP | 2005273131 | 12/2003 |
| JP | 2005 273131 | 10/2005 |
| WO | WO 02/04740 A2 | 1/2002 |

OTHER PUBLICATIONS

U.S. Appl. No. 10/876,315, filed Jun. 24, 2004, Faler et al.
U.S. Appl. No. 10/892,919, filed Jul. 16, 2004, Faler et al.
U.S. Appl. No. 11/021,325, filed Dec. 23, 2004, Rearick et al.
H. R. Lasman, "Vinyl And Urethane Coated Fabrics For Shoe Uppers", Satra-North America Conference Paper, May 1974, pp. 247-262.
T. J. Brandt, "Urethane-Coated Fabrics For Shoe Uppers", Journal Of Coated Fabrics, vol. 1, Jul. 1974, pp. 3-6.
H. R. Lasman, "Vinyl And Urethane Coated Fabrics For Shoe Uppers", Journal Of Coated Fabrics, vol. 4, Apr. 1975, pp. 256-271.
"Footwear Materials: The Challenge Of Synthetics"—A Report From The U.K., Journal Of Coated Fabrics, vol. 13, Oct. 1983, pp. 126-132.
M. S. Bhatnagar, "Polyurethane Fibres—Applications" Colourage, Sep. 1992, pp. 49-51.
J. Hemmrich et al., "Porous Structural Forms Resulting From Aggregate Modification in Polyurethane Dispersions By Means Of Isothermic Foam Coagulation", *Journal Of Coated Fabrics*, vol. 22, Apr. 1993, pp. 268-278.
Abstract "Range Of PUD's", Pigment & Resin Technology, 29, No. 5, 2000, p. 309.
VELVECRON XPC30002, Technical Data Sheet, PPG Industries, Inc., Dec. 13, 2000.
Data Sheet—HD-2101; C. L. Hauthaway & Sons Corporation, Lynn, MA, Sep. 27, 2004.
Partial International Search Report mailed May 5, 2006 for International Application No. PCT/US2005/046371, corresponding to U.S. Appl. No. 11/020,921.

* cited by examiner

COLOR HARMONIZATION COATINGS FOR ARTICLES OF MANUFACTURE COMPRISING DIFFERENT SUBSTRATE MATERIALS

FIELD OF THE INVENTION

The present invention relates to color harmonization, and more particularly relates to the use of a coating composition that provides substantially uniform visual characteristics for articles of manufacture comprising different types of substrate materials.

BACKGROUND INFORMATION

Many articles of manufacture are made from different types of components that are assembled together. It is often desirable to maintain color uniformity among the various components. However, when the components are made of different types of materials, it can be difficult to provide a uniform visual appearance of the article when the components are assembled.

For example, footwear such as athletic shoes often comprise different types of materials including natural leather, synthetic leather, vinyl, fabric, foam and rubber. A different coating composition is conventionally applied to each type of substrate material. For example, one type of coating may be applied to natural leather upper components of the shoe, and another type of coating may be applied to synthetic leather upper components of the shoe. Furthermore, it is common to incorporate pigments into foam midsoles of such shoes in order to impart color to the midsole and/or to provide uniformity and/or color coordination between the upper components of the shoe and the midsole. Such use of multiple specialized coatings and pigments may result in relatively complex and costly manufacturing processes, inventory issues and may also gives rise to the need to "color match" the different coatings.

Color matching is a process by which the visual characteristics of more than one coating are "matched" such that the two or more coatings give the same or substantially same appearance. Color matching can be desired when, for example, two different substrates on the same article of manufacture are coated with two different coatings. Color matching can also be desired when trying to identify a coating that matches a previously coated article or component. For example, automotive body shops often paint repaired portions of autobodies with coating compositions selected to match the color of the original autobody paint; such color matched coatings often have different compositions from the original coatings, and may comprise significantly different types of coatings such as air-cured versus heat-cured coatings.

While color matched components may have substantially the same appearance in some viewing and illumination conditions, they may not maintain the same appearance when the viewing angle is changed, when the spectral distribution of the light source is changed and/or when the coatings have aged. For example, some color matched components may have the same appearance in daylight conditions, but may not match under fluorescent and/or incandescent lighting. When a color match is dependent on illumination or viewing condition, the match is termed conditional or "metameric".

It would be desirable to provide a coating composition capable of coating various different types of substrates of an article of manufacture while eliminating the need to do color matching.

SUMMARY OF THE INVENTION

An embodiment of the present invention provides an article of manufacture comprising a first substrate comprising a first flexible material, a second substrate comprising a second material different from the first material, and a color harmonization coating covering at least a portion of the first substrate and at least a portion of the second substrate.

Another embodiment of the present invention provides footwear comprising a first substrate comprising a first flexible material, a second substrate comprising a second flexible material different from the first flexible material, and a color harmonization coating covering at least a portion of the first substrate and at least a portion of the second substrate.

A further embodiment of the present invention provides a method of making an article of manufacture including first and second flexible substrates of different materials. The method comprises coating at least a portion of the first flexible substrate with a color harmonization coating composition, and coating at least a portion of the second flexible substrate with the color harmonization coating composition.

Another embodiment of the present invention provides a method of making footwear including first and second flexible substrates of different materials. The method comprises coating at least a portion of the first flexible substrate with a color harmonization coating composition, and coating at least a portion of the second flexible substrate with the color harmonization coating composition.

A further embodiment of the present invention provides an article of manufacture comprising a first substrate comprising foam, a second substrate, and a color harmonization coating comprising an aqueous polyurethane resin and a colorant, wherein at least part of the first substrate and at least part of the second substrate are coated with the color harmonization coating.

Another embodiment of the present invention provides footwear comprising a first substrate comprising foam, a second substrate, and a color harmonization coating comprising an aqueous polyurethane resin and a colorant, wherein at least part of the first substrate and at least part of the second substrate are coated with the color harmonization coating.

BRIEF DESCRIPTION OF THE DRAWINGS

The file of this patent contains at least one drawing executed in color. Copies of this patent or patent application publication with color drawings will be provided by the Office upon request and payment of the necessary fee.

DETAILED DESCRIPTION

The present invention provides color harmonization for articles of manufacture comprising two or more components of different materials or substrates. "Color harmonization" and like terms mean the use of the same or substantially similar coating compositions to provide substantially uniform visual characteristics for two or more different types of substrates under more than one lighting condition. A "color harmonization coating" is a coating that exhibits such substantially uniform visual characteristics. The color harmonization coatings may be used to coat two or more components of an article of manufacture to provide substantially uniform color for the multiple components, thereby avoiding the problems and/or labor associated with conventional color matching techniques.

In accordance with an embodiment of the invention, at least one of the components of the article of manufacture comprises a flexible substrate. As used herein, the term "flexible substrate" refers to a substrate that can undergo mechanical stresses, such as bending, stretching, compression and the like, without significant irreversible change. Examples of flexible substrates include natural leather, synthetic leather, finished natural leather, finished synthetic leather, suede, vinyl, nylon, ethylene vinyl acetate foam (EVA foam), thermoplastic urethane (TPU), fluid-filled bladders, polyolefins and polyolefin blends, polyvinyl acetate and copolymers, polyvinyl chloride and copolymers, urethane elastomers, synthetic textiles and natural textiles.

In a non-limiting embodiment, at least one flexible substrate of the article may comprise foam. As used herein the term "foam substrate" means a polymeric and/or natural material that comprises a plurality of open and/or closed cells. Examples of foam substrates include polystyrene foams, polymethacrylimide foams, polyvinylchloride foams, polyurethane foams, polypropylene foams, and polyethylene foams. Examples of olefinic foams include polypropylene, ethylene vinyl acetate (EVA) and polyethylene foams.

In a non-limiting embodiment of the present invention, the article of manufacture comprises footwear. As used herein, the term "footwear" includes athletic and sport shoes, men's and women's dress shoes, men's and women's casual shoes, children's shoes, sandals, flip flops, boots, work boots, outdoor footwear, orthopedic shoes, slippers and the like. Examples of footwear components include soles, midsoles, upper materials and liners. As a particular non-limiting example, athletic shoes may comprise natural leather, synthetic leather and/or textile uppers, and EVA foam midsoles.

Figure 1:
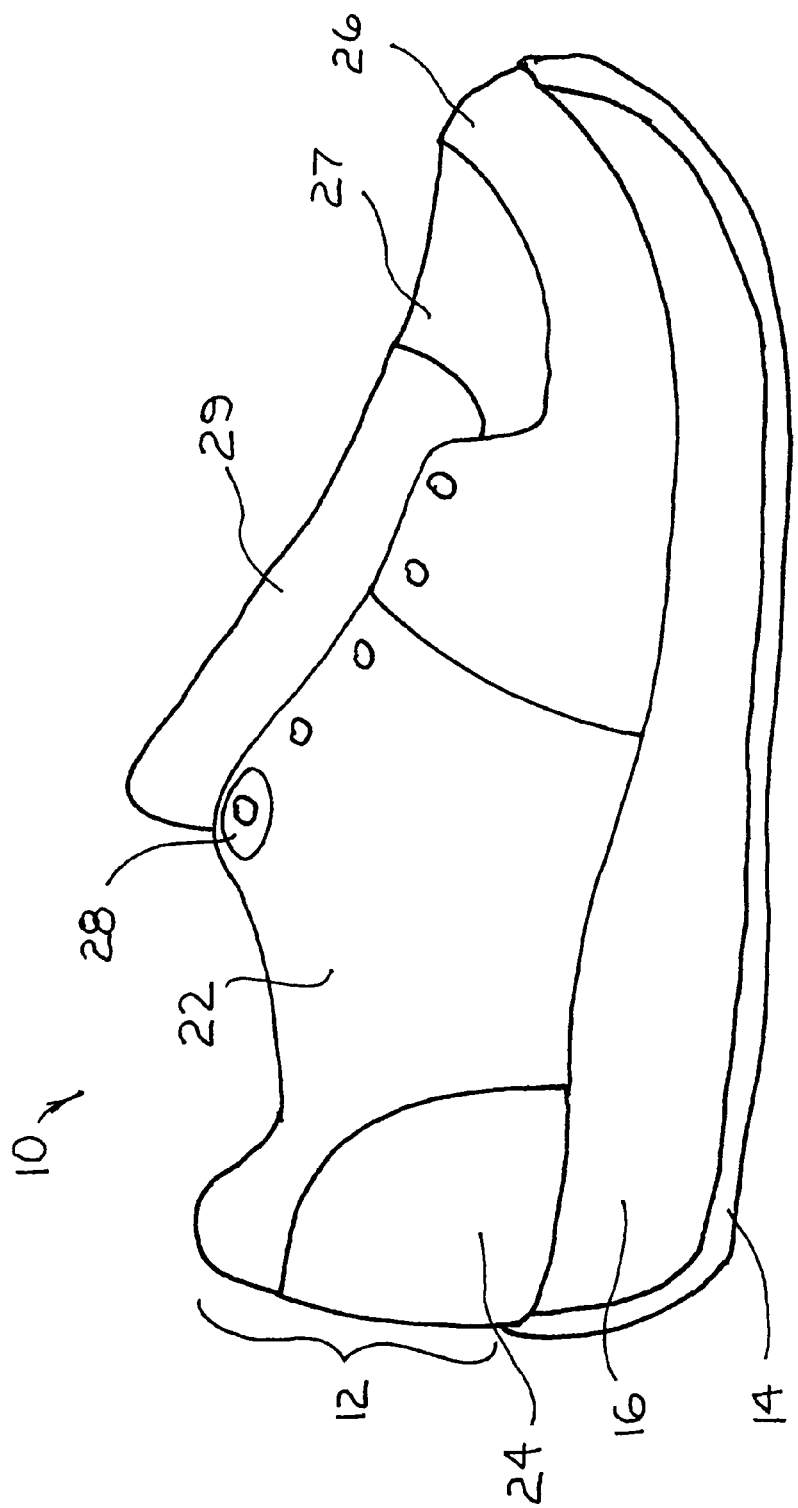
FIG. 1 is a partially schematic side view of an athletic shoe comprising multiple components made from different types of substrate materials which may be coated with a color harmonization coating in accordance with a non-limiting embodiment of the present invention.

FIG. 1 illustrates an athletic shoe comprising multiple components made from different types of substrate materials which may be coated with a color harmonization coating in accordance with an embodiment of the present invention. The shoe 10 includes an upper portion 12, a sole 14, and a midsole 16. The upper portion 12 of the shoe 10 includes various sections such as a body 22, heel 24, toe 26, midsection 27, eyelet 28, and tongue 29. In accordance with conventional shoe design and fabrication techniques, the various upper sections of the shoe 10 may be made from different types of materials. For example, the body section 22 may comprise natural leather, the heel 24 may comprise TPU, the toe 26 may comprise synthetic leather, the midsection 27 may comprise natural leather, the eyelet 28 may comprise nylon, and the tongue 29 may comprise synthetic leather or fabric. These various components may be assembled together by techniques such as sewing, gluing and the like.

The sole 14 and midsole 16 of the shoe 10 may be made from various types of materials which are typically different from the materials of the upper portion 12. For example, the sole 14 may be made of rubber or the like, while the midsole 16 may comprise foam substrates such as EVA foam and the like, as listed above.

In addition to providing substantially uniform visual characteristics among the various components of the upper section 12, it is often desirable to provide substantially uniform visual characteristics between the midsole 16 and at least one of the components of the upper portion 12. Furthermore, in some types of shoes, it is desirable to provide substantially uniform visual characteristics between the sole 14 and the midsole 16 and/or provide substantially uniform visual characteristics between the sole 14 and at least some of the sections of the upper portion 12.

The conventional process of coating shoes involves each component being made and colored separately, usually by different suppliers and/or with different coatings. This creates several disadvantages. The lead times required to make changes are long so that all of the suppliers can match the needed color and supply the quantities needed. When different suppliers produce the materials the method of producing the color can differ. Conventional shoe components can typically appear to be a different shade of color depending on the lighting even if the color is matched initially. The use of different processes to apply the different coatings can make the color match between components even worse.

In accordance with an embodiment of the present invention, a color harmonization coating may be applied to at least two of the different shoe components comprising different substrates, such as those shown in FIG. 1, in order to provide the desired uniform visual characteristics without the need to color match. The present color harmonization method may provide one or more advantages over conventional shoe assembly methods by using one coating system that can be used to coat different shoe component substrates. As a result, the cycle times to produce shoes can be greatly reduced since all of the shoe substrates can be ordered in a standard color such as white or black. The shoe manufacturer can paint all components themselves with the same paint using the same methods. Also, the shoe components can be coated to obtain the desired colors needed for the shoe. The present methods also lend themselves to production of small batches of shoes having unique color and/or visual effect. Further, since the same coating may be applied to the different shoe component substrates, they will have good color harmony in all lighting situations. In addition, any fading of the color as a result of wear or cleaning may be substantially uniform across the different substrates, thereby maintaining color harmony throughout the life of the shoe.

In addition to footwear, other examples of articles of manufacture that may undergo color harmonization in accordance with embodiments of the present invention include automotive upholstery, automotive interiors, furniture upholstery, hand bags, clothing, coats, wallets, wheel covers, luggage, cases, sporting goods, sports equipment and the like. For example, automotive or furniture upholstery may comprise a combination of natural leather and synthetic leather components which may be coated with a color harmonization coating in accordance with an embodiment of the present invention.

As used herein, the term "coating" means a material that forms a substantially continuous surface layer or film on an exterior surface of a substrate. The thickness of the coating is measured from the surface of the substrate. In some embodiments, a portion of the coating may penetrate at least partially into the substrate. For example, the coating may penetrate at least partially into the pores of a leather or foam substrate. It will be appreciated that the coatings of the present invention are sprayed or otherwise deposited onto the substrates themselves, which may or may not have other coatings applied thereto, and are not applied as a laminate nor are they applied to release paper and transferred to a substrate. Thus, application of the present coating compositions can reduce labor time.

The color harmonization coatings of the present invention can be applied to the substrates by any conventional coating application process. Example coating application methods include spraying, slot coating, roll coating, curtain coating, dipping, screen printing, brushing or rod coating. In some embodiments, the coating is applied to substantially all of an entire exterior surface of the substrate. In other embodiments, the coating is applied to a portion of an exterior surface of the substrate.

For some applications, it may be desired to apply the coating directly to an exterior surface of the substrate. In other applications, it may be desired to apply a primer to the exterior of the substrate before applying the coating. Examples of primers include epoxies, epoxy polyamides, polyolefins, chlorinated polyolefins, vinyl polymers, polyurethanes, alkyds, acrylics, polyesters and the like. In other embodiments, a protective layer such as a sealer and/or clear coat may be applied to the exterior surface of the coating to provide a protective and/or visually aesthetic layer. The coating composition is suitable for any type of coating, and is particularly suitable as a topcoat. In one embodiment, the coating can comprise a single application coating or monocoat. In another embodiment, the coating composition can be applied as one layer in a multiple layer coating system having two or more layers in which each coat may or may not contain different components.

In one embodiment of the present invention, the color harmonization coating composition is an aqueous coating comprising an aqueous resin dispersion and a colorant. In certain embodiments, the aqueous coating composition may be substantially solvent-free. The term "substantially solvent-free" as used herein means that the coating composition contains less than about 15 or 20 weight percent organic solvents, e.g., less than 5 or 10 weight percent, with weight percent being based on the total weight of the coating composition to be applied to the substrate. For example, the coating composition may contain from zero to 2 or 3 weight percent organic solvents.

The term "aqueous" as used herein means coating compositions in which the carrier fluid of the composition is predominantly water on a weight percent basis, i.e., more than 50 weight percent of the carrier comprises water. The remainder of the carrier comprises less than 50 weight percent organic solvent, typically less than 25 weight percent, for example, less than 15 weight percent. Based on the total weight of the coating composition (including the carrier and solids), the water may comprise from about 20 to about 80 weight percent, typically from about 30 to about 70 weight percent, of the total composition.

The substantially solvent-free, aqueous coating compositions of some embodiments of the present invention comprise polyurethane dispersions. Any polyurethane resin that forms a suitable film and is compatible with water-based compositions can be used in accordance with these embodiments of the present invention, absent compatibility problems. Suitable polyurethane resins include those formed from a polyisocyanate, an active hydrogen-containing material, such as a polyol, as polyether, a polyester, a polycarbonate, a polyamide, a polyurethane, a polyurea, a polyamine, a polyolefin, a siloxane polyol, and/or mixtures thereof, an acid functional material having a functional group reactive with isocyanate and optionally a polyamine. Some example resins that may be suitable for use in the present coating compositions are described in U.S. Pat. No. 5,939,491, which is incorporated by reference herein.

The film-forming polyurethane resin is generally present in the coating in an amount greater than about 20 weight percent, such as greater than about 40 weight percent, and less than 90 weight percent, with weight percent being based on the total solid weight of the cured coating. For example, the weight percent of resin can be between 20 and 80 weight percent. In one non-limiting embodiment, the polyurethane has a molecular weight average of at least 10,000, such as at least 25,000 or 100,000 or higher. The polyurethane resin in certain embodiments has a hydroxyl number of less than about 10, such as less than about 5, such as less than about 3.

In one non-limiting embodiment, di and/or trifunctional acrylics, polyesters, polyethers, polycarbonates, polyamides, epoxies and/or vinyls can be added as a partial replacement for a portion of the polyurethane dispersion of the aqueous coating compositions. Suitable di and/or trifunctional acrylic resins can include unsaturated acrylic monomers and/or copolymers with vinyl monomers prepared through emulsion polymerization. Suitable polyester resins can include reaction products of polyfunctional acid, anhydrides, polyfunctional alcohols, and monofunctional acids and alcohols. Other suitable resins include hybrids or mixtures of any of these resins, for example, acrylic/polyurethane and/or acrylic/polyester hybrids or blends.

In another embodiment of the present invention, a solvent based polymer coating composition may be used. For example, the solvent based coating may comprise two components. In one embodiment, the first component may comprise a first polyester polyol having a first functionality and a second polyester polyol having a second functionality, wherein the second functionality is greater than the first functionality. The second component comprises an isocyanate. In certain embodiments, the NCO:OH ratio of the coating composition can be 0.8:1 or higher. It will be appreciated that the two components, when combined, produce a polyurethane coating.

In one embodiment, the difference between the hydroxyl numbers of the first polyester polyol and the second polyester polyol is at least 10. In another embodiment, the difference between the hydroxyl numbers of the first polyester polyol and the second polyester polyol is at least 20. In one embodiment, the first polyester polyol of the first component has a low functionality. As used herein, the term "low functionality" means that the polyester polyol has a hydroxyl number of less than about 65. A suitable low functionality polyester polyol has a hydroxyl number of from about 40 to about 60. In one embodiment, the first polyester polyol has a hydroxyl number of from about 54 to about 58. The low functionality of the first polyester polyol results in increased flexibility and a lower tendency to form crosslinks when reacted with an isocyanate in a coating. Any polyester polyol having a low functionality can be used in the present invention. For example, the first polyester polyol can be the reaction product of carboxylic acids and polyalcohols; such a product is commercially available as DESMOPHEN 1625A from Bayer Corporation.

In one embodiment, the second polyester polyol of the first component has a medium functionality. As used herein, the term "medium functionality" means that the polyester polyol has a hydroxyl number of from about 90 to about 125. In one embodiment, the second polyester polyol has a hydroxyl number of from about 104 to about 118. The medium functionality of the second polyester polyol typically increases the crosslink density of the coating, resulting in increased coating hardness and improved chemical resistance. Any polyester polyol having a medium functionality can be used in the present invention. For example, the second polyester polyol can be the reaction product of one or more polyols, one or more aromatic dicarboxylic acids and/or anhydrides, and one or more aliphatic dicarboxylic acids and/or anhydrides. The second polyester polyol can be the reaction product of isophthalic acid, phthalic anhydride, adipic acid, trimethylol propane, and 1,6 hexanediol; such a product is commercially available as DESMOPHEN 670 A-80 from Bayer Corporation. In one embodiment, the second polyester polyol specifically excludes neopentyl glycol.

The first and second polyester polyols can be combined together to form a polyester polyol blend in the first component. In one embodiment, the ratio of the first polyester polyol to the second polyester polyol in the polyester polyol blend is from about 5:1 to about 8:1. In another embodiment, the ratio of the first polyester polyol to the second polyester polyol in the polyester polyol blend is from about 6.5:1 to about 7.5:1. The amount of the first polyester polyol and the amount of the second polyester polyol in the blend can be selected to optimize certain features of each polyol. For example, an increased amount of the first polyester polyol results in increased flexibility, while an increased amount of the second polyester polyol results in increased hardness and chemical resistance. One skilled in the art can determine the best ratio based upon these considerations depending on the needs of the user.

In one embodiment, the first polyester polyol, the second polyester polyol and one or more acrylic polyols can be combined to produce a first component. Acrylic polyol(s) can be added to the polyester polyol blend in the first component in order to further increase the strength of the coating. In one embodiment, the acrylic polyol is a styrenated acrylic polyol. Examples of other suitable acrylic polyols include copolymers of methyl methacrylate with hydroxy functional (meth) acrylate monomers, copolymers of isobornyl (meth)acrylate, ethyl (meth)acrylate copolymers, hydroxyl-ethyl (meth)acrylate, and hydroxyl-propyl methacrylate. The acrylic polyols can have functionality or be substantially non-functional. In one embodiment, acrylic polyols used in the present invention typically have a hydroxyl number of at least about 50. In one embodiment, acrylic polyols, such as styrenated acrylic polyols, can be added to the first component in an amount up to about 40 weight percent.

The acrylic polyols can be provided in any amount desired to provide sufficient strength to the coating. The acrylic polyols will typically crosslink with isocyanate in the final coating, thereby increasing the crosslink density and hardness of the coating. Since increased amounts of acrylic polyol may increase the strength of the coating, but decrease the amount of flexibility, the desired amount of acrylic polyol can be determined based upon the needs of the user.

The second component of the two-component coating may comprise an isocyanate. As used herein, the term "isocyanate" includes polyisocyanates and cyclic trimers of polyisocyanates. Suitable isocyanates include isophorone diisocyanate, 1,3- or 1,4-cyclohexane diisocyanate, dicyclohexylmethane diisocyanate, tetraalkylxyene diisocyanates such as m-tetramethyl xylene diisocyanate, p-phenylene diisocyanate, polymethylene polyphenyl isocyanate, 2,6-toluene diisocyanate, dianisdine diisocyanate, bitolylene diisocyanate, naphthalene-1,4-diisocyanate, bis(4-isocyanato phenyl)methane, 4,4'-diphenylpropance diisocyanate, hexamethylene diisocyanate, and an isocyanate trimer of hexamethylene diisocyanate.

The amount of polyester polyol blend, and acrylic polyol if used, in the first component and the amount of isocyanate in the second component can be selected such that the ratio of isocyanate groups to hydroxyl groups, i.e., NCO:OH, will produce a coating composition having an NCO:OH ratio of greater than at least 0.8:1 or 1:1, such as at least 1.7:1, at least 2:1, or at least 3:1. Although not wishing to be bound by this mechanism, it is believed that the unreacted NCO groups may bond into the surface of a flexible substrate, such as thermoplastic urethane, to produce a flexible coating with improved surface adhesion, mar resistance, pencil hardness (gouge) and/or overall cure properties.

The coatings of the present invention may also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating of the present invention.

Example colorants include pigments, dyes and tints, such as those used in the paint industry and/or listed in the Dry Color Manufacturers Association (DCMA) as well as special effect compositions. A colorant may include, for example, a finely divided solid powder which is insoluble but wettable under the conditions of use. A colorant can be organic or inorganic and can be agglomerated or non-agglomerated.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The term pigment and colored filler can be used interchangeably.

Example dyes include, but are not limited to, those which are solvent and/or aqueous based, such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants or colorant particles that produce a desired visible color and/or opacity and/or visual effect. Nanoparticle dispersions can include colorants such as pigments or dyes having a particle size of less than about 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Application Publication No. 2003/0125417, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,315 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Patent Application Publication No. 2003/0125416, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Examples photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The present color harmonization coating compositions may also optionally include other ingredients such as cross-linkers, extenders, ultra-violet (UV) absorbers, light stabilizers, plasticizers, surfactants, leveling agents, adhesion promoters, rheology modifiers, hindered amine light stabilizers (HALS) and wetting agents in a total amount of up to 80 weight percent based on the total weight percent of the coating composition to be applied to the substrate. Suitable cross-linkers can be selected by those skilled in the art based upon the chemistry of the coating. Examples include carbodiimides, aminoplast resins and phenoplast resins and mixtures thereof, polyisocyanates and blocked polyisocyanates, anhydrides, polyepoxides, polyacids, polyols and polyamines. Water-based carbodiimides may be preferred in certain aqueous based coating compositions because they do not contribute a significant amount of organic solvents to the coating composition. When a cross-linker is used, it is generally present in an amount of up to about 50 weight percent, based on the total solid weight of the cured coating.

Additional optional coating additives include odor effect compositions, which impart a desired odor to the coating and/or limit undesired odors from developing over time. Example odor effect compositions can include fragrance additives, such as perfumes and/or colognes, and/or odor masking compositions, such as deodorants. In a non-limiting embodiment, the odor effect composition can comprise additives that produce or emit the smell of new leather.

Other suitable coating components include one or more texture-enhancers that improve the surface feel and/or that enhance stain resistance of the coating. In one non-limiting embodiment, the texture-enhancer imparts a soft feel to the coating. As used herein, the term "soft feel" means the coated substrate exhibits an altered tactile property such as a simulated velvet or leather tactile feel when touched. The texture-enhancer can be an additive that can be added to the coating composition such as silica flattening agents and/or wax additives. Example silica flattening agents can include ACE-MATT OK 412 and ACEMATT TS 100 commercially available from Degussa, Inc. Example wax additives can include polytetraethylene oxide, fluorinated waxes, polyethylene waxes and natural waxes such as paraffin and/or carnauba. In another non-limiting embodiment, the texture-enhancer can be incorporated within the polyurethane resin itself. For example, components that will impart a larger "soft-segment" to the polyurethane can be used. Examples include polytetramethylene ether glycol commercially available under the name TERATHANE 2000 from Invista, Inc.

The color harmonization coating can be substantially flexible, such that the coating can undergo mechanical stresses, such as bending, stretching and/or compression without significant irreversible change. In one non-limiting embodiment, when the coating is compacted, folded, creased and/or bent, subsequent flaking, marring and/or altered visual appearance of the coating is minimized. For example, when a flexible substrate coated with the coating is elongated or compressed, the color harmonization coating can maintain wear resistance and/or deformation properties upon restoration of the substrate to its original size and shape.

The following examples are intended to illustrate various aspects of the invention, and are not intended to limit the scope of the invention.

Example 1

An aqueous color harmonization coating composition was made and applied to athletic shoe components comprising different materials as follows. A polyurethane dispersion was made by charging a reaction vessel equipped with stirrer, thermocouple, condenser and nitrogen inlet with 1447.3 g polytetramethylene ether glycol having a molecular weight of about 1,000 sold under the designation TERATHANE 1000, 145.4 g dimethylolpropionic acid and heated to 60° C. 965.3 g isophorone diisocyanate was added over 13 minutes followed by 637.5 g methyl ethyl ketone and 4.34 g dibutyltin dilaurate. The reaction exothermed to 72° C. The reaction temperature was raised to 80° C. and the contents were stirred until the isocyanate equivalent weight was 923.5. Then 114.0 g dimethylolpropionic acid was added to the reaction flask. The contents were stirred until the isocyanate equivalent weight was 1430.2.

1512.2 g of the above prepolymer at a temperature of 75° C. was then added over a 16 minutes span to a solution of 2201.9 g deionized water, 58 g adipic acid dihydrazide and 76.2 dimethyl ethanol amine stirring at a temperature of 25° C. and 515 rpm in a cylindrical gallon reaction flask equipped with baffles, double pitched bladed stirrer, thermocouple and condenser. The dispersion temperature after this addition was 40° C. The reaction contents were stirred until no evidence of isocyanate was observed by FTIR. This dispersion was transferred to a flask equipped with a stirrer, thermocouple, condenser and a receiver. The dispersion was heated to 50° C. and methyl ethyl ketone and water were removed by vacuum distillation.

The final polyurethane dispersion had a solids content of 37.48 weight percent (measured for one hour at 110° C.), a Brookfield viscosity of 1450 centipoise using a #3 spindle at 60 rpm, an acid content of 0.240 meq acid/g, a base content of 0.247 meq base/g, a residual methyl ethyl ketone content of 1.16 weight percent and a weight average molecular weight of 77274 in DMF.

A color harmonization coating composition was made by mixing 56.31 g of the polyurethane dispersion with 14.37 g CARBODILITE V02-L2 crosslinker from Nisshinbo Chemicals, 23.56 g OneSource 9292-R3817 red tint from PPG Industries, Inc., and 5.76 g of de-ionized water in a beaker. The materials were agitated using a pneumatic notary air stirrer and a low lift impeller blade. Mixing was performed for five minutes under low to medium speed. The mixture was filtered through 18 TXX polyester multifilament mesh into a clean receptacle. The resulting coating was allowed to equilibrate for approximately 24 hours.

The color harmonization coating composition was then spray-applied to various substrate materials of an athletic shoe including molded EVA foam, thermoplastic urethane (TPU), PVC vinyl, and synthetic leather. The synthetic leather had previously been coated with polyurethane ("PU coated synthetic leather"). Each substrate material was cleaned with isopropanol before the coating was applied. The color harmonization coating composition was spray applied to the shoe component substrates using a Binks Model 7 suction feed gun at 40 psi. The coating was applied to a dry film thickness of 10-50 microns. The coated substrates were flashed for 10 minutes at ambient temperature then cured for 5 minutes at 180° F. Table 1 lists the coated substrates and the resultant cross-hatch adhesion, flexibility and appearance properties before and after humidity testing conducted pursuant to ASTM Standard D2247-99.

TABLE 1

Aqueous Color Harmonization Coating Properties

| Substrate | X-Hatch Adhesion %* | | Flexibility** | | Appearance*** | |
|---|---|---|---|---|---|---|
| | Pre-humidity test | Post-humidity test | Pre-humidity test | Post-humidity test | Pre-humidity test | Post-humidity test |
| Molded EVA foam | 100 | 100 | OK | OK | Good | Good |
| TPU | 100 | 100 | OK | OK | Good | Good |
| PVC (vinyl) | 100 | 90 | OK | OK | Good | Minor blistering |
| PU coated synthetic leather | 100 | 100 | OK | OK | Good | Good |

*The cross hatch adhesion of 100% corresponds to an ASTM D3359 reading of 5 (on a scale of 1 to 5), i.e., no loss of adhesion.
**"OK" means no visually observable cracks or creases after the coated substrate had been manually flexed for about 1 minute.
***"Good" means a smooth coating with no visible blistering.

Figure 2:
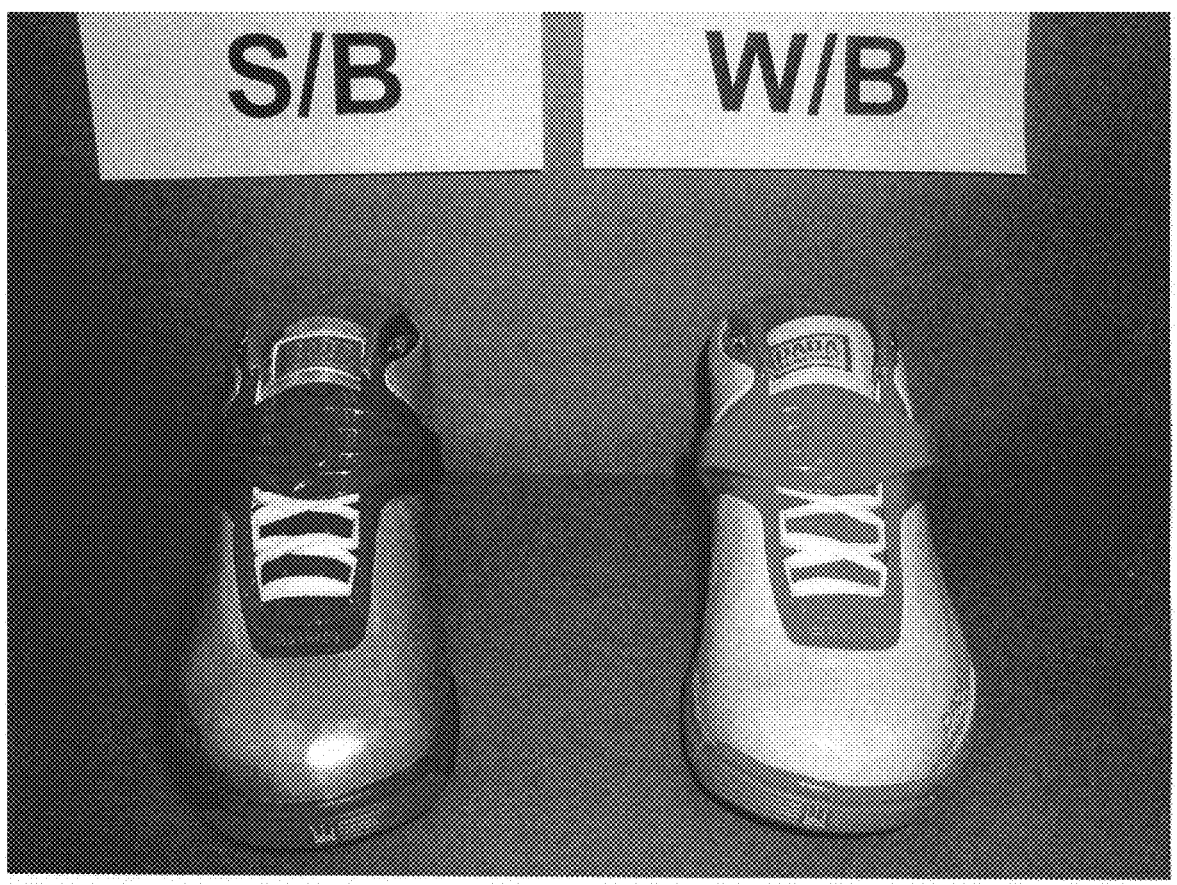
FIGS. 2-9 are color photographs of athletic shoes including color harmonization coatings in accordance with embodiments of the present invention.
Figure 3:
Figure 4:
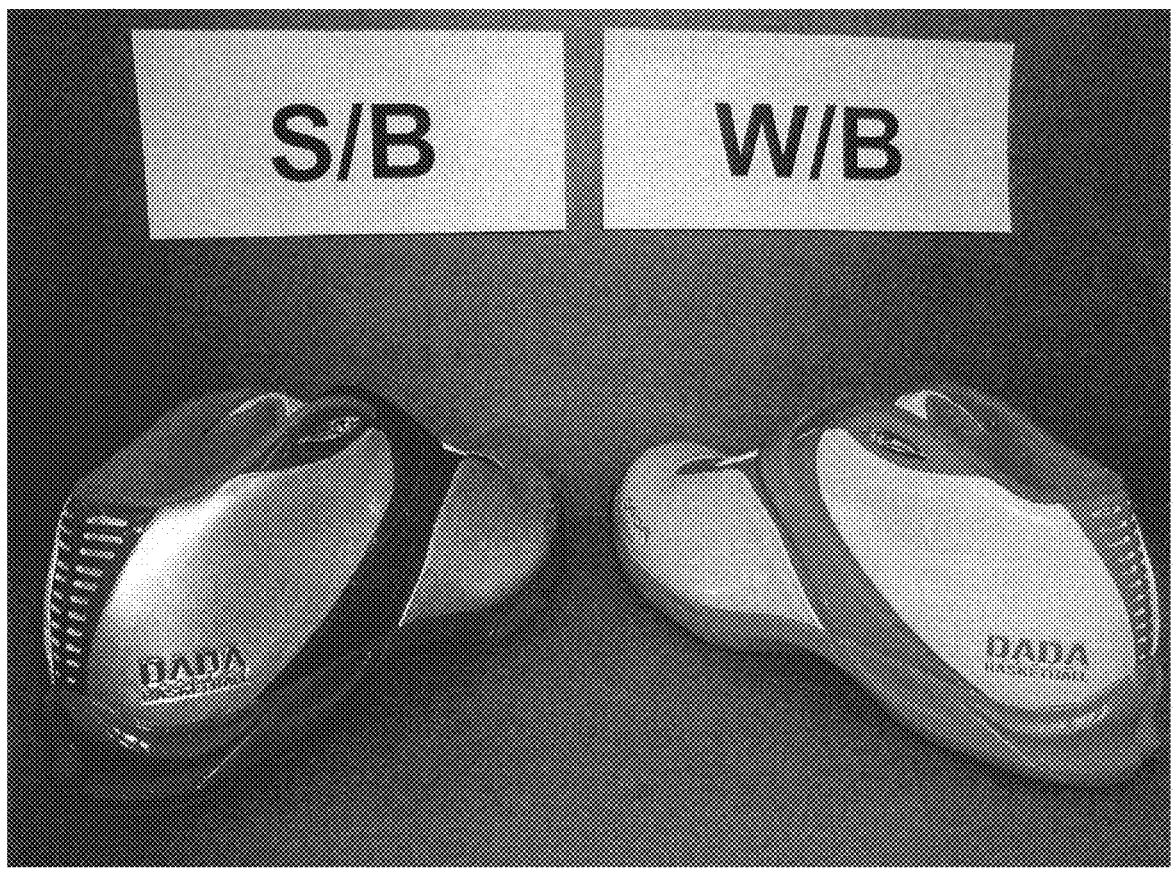

FIGS. 2-4 are photographs of an athletic shoe assembled from EVA foam, TPU and synthetic leather components having an aqueous color harmonization coating as described above. The shoe appears on the right side of each photograph marked "W/B". The midsole of the shoe comprises the coated EVA foam. The red upper components (midsection, heel and tongue) comprise the coated synthetic leather. The red band extending from the midsection over the laces comprises the coated TPU.

As shown from the above results and the "W/B" photographs of FIGS. 2-4, the color harmonization coating adheres to all of the different substrate materials before and after humidity testing, demonstrating that the coating can be used to coat many of the components of conventional shoes. In addition, there were no blisters pre-humidity in all samples, while there were only minor blisters in the post-humidity PVC vinyl sample (all others were fine). The coating provided all of the coated substrates with substantially the same color characteristics as determined visually.

Example 2

A solvent-based color harmonization coating was made and applied to athletic shoe substrates as follows. A two-component pigmented polyurethane coating composition was prepared. As shown in Table 2, Component A is comprised of two polyester resins and other ingredients.

TABLE 2

Solvent-Based 2K Polyurethane Formulations

| Ingredient | Red Coat Wt. % | Clear Coat Wt. % |
|---|---|---|
| Component A | | |
| Polyester Polyol (a)[1] | 7.4 | 14.7 |
| Polyester Polyol (b)[2] | 1.0 | 2.0 |
| Acrylic Resin Solution[3] | 3.6 | — |

TABLE 2-continued

Solvent-Based 2K Polyurethane Formulations

| Ingredient | Red Coat Wt. % | Clear Coat Wt. % |
|---|---|---|
| Pigmentation | 4.6 | — |
| Acrylic Polyol Solution[4] | — | 2.1 |
| Cellulose acetate butyrate Resin[5] | 1.8 | — |
| Non functional acrylic resins | — | 8.7 |
| UV stablizers/absorbers[6] | .36 | .92 |
| Tin Catalyst[7] | .03 | .02 |
| BENTONE/Silicon Dioxide additives[8] | .03 | — |
| Polysiloxane additive[9] | .03 | .05 |
| Solvent[10] | 37.06 | 38.66 |
| Coating Solvent Reducer | 30.2[11] | 22.1[12] |
| Component B | | |
| HDI Isocyanate[13] | 8.4 | 9.4 |
| Solvent Blend | 5.6[14] | 1.5[15] |
| NCO/OH | 3.4 | 2.2 |

% based on total weight (g) of component A and B combined
[1]DESMOPHEN 1652A - functional polyester commercially available from Bayer Corporation
[2]DESMOPHEN 670A-80 - functional polyester commercially available from Bayer Corporation
[3]Functional acrylic grind vehicle in concentrated tints
[4]Functional acrylic polyol, PPG automotive clearcoat
[5]CAB-531-1 and CAB-551- 0.01 - cellulose acetate butyrate which is commercially available from Eastman Corporation
[6]TINUVIN 328 & TINUVIN 292, which is commercially available from CIBA Specialty Chemicals
[7]DiButylTinDilaurate, chemical accelerator
[8]BENTONE 34, AEROSIL 200 - suspending agents commercially available from Elementis Specialties & Degussa Corporation.
[9]BAYSILONE OL17- flow control additive which is commercially available from Bayer Corporation
[10]Solvents from resin and additive solutions comprising predominantly n-butyl acetate, intermediate amounts of methyl ether propylene glycol acetate and SOLVESSO 100 aromatic solvent commercially available from ExxonMobil Chemical, and minor amounts of toluene, xylene and mineral spirits
[11]Blended solvent comprising ethyl acetate (52.3 parts by weight), exempt high initial VM&P naptha (14.6 parts by weight), isopropyl alcohol (13.7 parts by weight), n-propoxypropanol (10.3 parts by weight), methyl ether propylene glycol acetate (8.4 parts by weight) and toluene (0.8 parts by weight)
[12]Blended solvent comprising diacetone alcohol (65.3 parts by weight), n-butyl acetate (24.3 parts by weight) and methyl ethyl ketone (10.4 parts by weight)
[13]DESMODUR N-3300 - hexamethylene polyisocyanate which is commercially available from Bayer Corporation
[14]Solvent blend comprising SOLVESSO 100 aromatic solvent commercially available from ExxonMobil Chemical (39.8 parts by weight), xylene (31.7 parts by weight), methyl ether propylene glycol acetate (20.2 parts by weight) and n-butyl acetate (8.3 parts by weight)
[15]Methyl n-amyl ketone NCO/OH - (weight of isocyanate/equivalent weight)/(weight of polyester polyols/equivalent weight)

Component A was prepared via the following procedure: As shown in Table 2, 7.4% t. wt. (33.12 g) polyester polyol (a) and 1.0% t. wt. (4.52 g) polyester polyol (b) were mixed at constant low speed using a rotary stirrer at ambient temperature. Subsequently, 23.68 g N-butyl acetate, 0.076 g 10% tin catalyst solution (90%-methyl amyl ketone) and 0.101 g polysiloxane additive were added to the resin solution with agitation. Next, 4.95 g UV absorber/stabilizer solution and 18.29 g of the final solvent blend consisting of 11.4% methyl ethyl ketone, 73.84% glycol ketone and 17.2% toluene were added to produce a final clearcoat composition. The blend was stirred for 20 minutes at medium speed to assure full agitation of the components before continuing with the procedure.

In order to produce a deep red metallic appearance, 36.62 g aluminum acrylic tint, 3.88 g $TiO_2$ acrylic tint, 34.95 g yellow-red dye and 47.15 g blue-red dye solution were premixed into the clearcoat using a mixing blade. Table 2 displays the weight percent acrylic and other tint additives. A small quantity of bentone (clay material) and silicon dioxide are typically added in these tints for anti-settling purposes.

The aluminum acrylic tint includes 6.93 g Toyal Alpate 7601 course lenticular aluminum having 19.29% pigment dispersed in an acrylic polyol resin having 42.44% binder with a solvent blend of N-butyl acetate, mineral spirits and glycol acetate (38.27% solvent). The $TiO_2$ acrylic tint, or flop adjuster, includes 1.69 g Titane Ultrafin L 530 titanium dioxide pigment having 43.59% pigment dispersed in acrylic polyol resin having 25.95% binder with a solvent blend of N-butyl acetate, mineral spirits and glycol acetate (30.42% solvent).

The yellow-red dye solution contains 5.51 g Neozapon red 335 pigment (15.78% pigment) dispersed in cellulose acetate butyrate resin having 2.0% binder with a solvent blend of propylene glycol monomethyl ether and methyl ethyl ketone (82.22% solvent). The blue-red dye solution contains 6.544 g Neozapon red 395 pigment having 13.88% pigment dispersed in cellulose acetate butyrate resin having 2.0% binder with a solvent blend of propylene glycol monomethyl ether and methyl ethyl ketone (84.12% solvent). An additional 40.73 g of cellulose acetate butyrate resin solution containing 6.62 g cellulose acetate butyrate resin having 15.31% binder with a solvent blend of N-butyl acetate and glycol acetate (84.69% solvent) were added as a wetting agent. The sample was agitated for at least 20 minutes to ensure complete incorporation of the pigments into the resin system. Additions of 1.0 g tin catalyst solution (90% methyl N-amyl ketone) and 0.86 g UV absorber solution (80%-N-butyl acetate/aromatic solvent) were added to Component A under agitation.

The two-component polyurethane composition was prepared and applied to the various substrates by the following procedure: 385 g Component A (including the solvent reducer) was mixed with 62.5 g Component B isocyanate blend (including the solvent reducer shown in Table 2) for 2 minutes to assure complete incorporation. The blended viscosity of the coating was measured at 19 seconds using #2 viscosity Zahn cup. The coating was applied over the substrates via a conventional Binks Model #7 gun at an atomization pressure of 50-60 psi and medium fluid flow. The coating was sprayed to cover each substrate to approximately 0.5 mils of film build thickness.

The clearcoat listed in Table 2 was made as follows. 14.73% t. wt. (21.95 g) polyester polyol (a) and 2.0% t. wt. (2.99 g) polyester polyol (b) were mixed at constant low speed using a rotary stirrer at ambient temperature. Subsequently, 17.68 g N-butyl acetate, 0.057 g 10% tin catalyst solution (90%-methyl amyl ketone) and 0.067 g polysiloxane additive were added with agitation to the resin solution. Next, 3.57 g UV absorber/stabilizer solution and 13.65 g of the solvent blend consisting of 11.8% methyl ethyl ketone, 71.4% glycol ketone and 17.2% toluene were added to produce a final clearcoat composition. The blend was stirred for 20 minutes at medium speed to assure full agitation of components before continuing with the procedure.

A second clearcoat formulation containing functional and non-functional acrylic polyols was then prepared. 2.05% t. wt. (3.06 g) acrylic polyol resin was mixed with 8.72% t. wt. (13.0 g) non-functional acrylic resin using a rotary stirrer at an ambient temperature at low speed. 6.41 g of various solvents consisting of ethyl acetate (13.2%), methyl N-amyl ketone (23.85%), glycol acetate (29.9%) and 100 aromatic solvent (33.07%) were added to the resin solution. Next, 0.43 g UV stabilizers/absorbers, 0.01 g 10% tin solution and 0.065 g of silicone additives were added to the clearcoat. The blend was stirred for 20 minutes at medium speed to assure full agitation of the components.

The two-component polyurethane clearcoat composition was prepared and applied by the following procedure: 10 g Component A prepared as described above and listed in Table 2 was mixed with 16 g Component B isocyanate blend as listed in Table 2 for 2 minutes to assure complete incorporation. The blended viscosity of the final coating was measured at 24 seconds using #2 viscosity Zahn cup. The clearcoat composition was applied over the uncured red 2K urethane coating described above and listed in Table 2, via a conventional Binks Model #7 gun at an atomization pressure of 50-60 psi and medium fluid flow. The clearcoat was sprayed to approximately 0.6 mils of film build thickness. A 10 minute flash at ambient temperature was preformed. The coatings were thermally baked at 180° F. for 30 minutes. All coated substrates were conditioned at 72° F. and ambient humidity for 7 days prior to testing to guarantee fully cured coating.

The physical performances of each substrate coated with the coating compositions are shown in Table 3. The samples passed initial/final adhesion testing, 10 day humidity testing and flexibility testing over each type of EVA foam, synthetic leather and thermoplastic polyurethane (TPU) substrate. According to the standard test method ASTM D3359 test method B, each of the coated substrates demonstrated a 5 classification on a scale of 0 to 5, indicating excellent adhesion onto the surface.

TABLE 3

Solvent-Based Color Harmonization Coating Adhesion Properties

|  | EVA Foam | Synthetic Leather | TPU |
| --- | --- | --- | --- |
| Initial Adhesion | 5B | 5B | 5B |
| Final Adhesion | 5B | 5B | 5B |
| Post-humidity Testing | 5B | 5B | 5B |

"B" refers to the test method B of ASTM Standard D3359- lattice pattern cut through coating to substrate, pressure-sensitive tape applied and quickly removed.
The numeric value represents adhesion measured on a scale of 0 to 5, with 5 showing no delamination and 0 showing 100% adhesion loss.
Initial adhesion - samples tested after cure
Final adhesion - after 7 day post-cure As shown in Table 3, standard ASTM D2247-99 10-day humidity testing was performed. The same adhesion test method was utilized for final adhesion performance after 10 day 100% relative humidity exposure. The results indicated no coating loss on the surface of each substrate for both samples. Again, the coatings on all of the substrates passed adhesion with a 5 classification.

As shown in Table 4, a flexibility bend test was performed on the samples for the three substrates. After a seven day post-cure, the substrate was manually bent once to 180°. There were no indications of cracking or stripping of the coating from any substrate.

TABLE 4

Solvent-Based Color Harmonization Coating Flexibility Properties

|  | EVA Foam | Synthetic Leather | TPU |
| --- | --- | --- | --- |
| Flexibility Test | No cracking | No cracking | No cracking |

Samples tested seven days post-cure by manually bending to 180°.
Coating was checked for cracking along the bent area.

Coated substrates produced as described above were assembled into an athletic shoe, as shown on the left side of each photograph of FIGS. 2-4 marked "S/B". The midsole of the shoe comprises the coated EVA foam. The red upper components (midsection, heel and tongue) comprise the coated synthetic leather. The red band extending from the midsection over the laces comprises the coated TPU. As can be seen in the "S/B" photographs of FIGS. 2-4, the coated shoe possesses excellent color harmonization.

Example 3

A solvent-based color harmonization coating was made and applied to athletic shoe substrates as follows. A two-component pigmented polyurethane coating composition was prepared. As shown in Table 5, Component A is comprised of two polyester resins and other ingredients.

TABLE 5

Solvent-Based 2K Polyurethane Formulation

| Ingredient | Red Coat |
| --- | --- |
| Component A |  |
| Polyester Polyol (a)[1] | 10.4 |
| Polyester Polyol (b)[2] | 1.4 |
| Acrylic Resin Solution[3] | 3.6 |
| Pigmentation | 3.5 |
| Acrylic Polyol Solution[4] | — |
| Cellulose acetate butyrate Resin[5] | 2.1 |
| Non functional acrylic resins | — |
| UV stablizers/absorbers[6] | 0.5 |
| Tin Catalyst[7] | 0.03 |
| BENTONE/Silicon Dioxide additives[8] | 0.10 |
| Polysiloxane additive[9] | 0.05 |
| Solvent[10] | 35.48 |
| DISPERBYK 167[11] | 0.01 |
| ANTI-TERRA-U100[11] | 0.02 |
| Coating Solvent Reducer[12] | 28.55 |
| Component B |  |
| HDI Isocyanate[13] | 8.6 |
| Solvent Blend[14] | 5.7 |
| NCO/OH | 3.0 |

% based on total weight (g) of component A and B combined
[1]DESMOPHEN 1652A- functional polyester commercially available from Bayer Corporation
[2]DESMOPHEN 670A-80 - functional polyester commercially available from Bayer Corporation
[3]Functional acrylic grind vehicle in concentrated tints
[4]Functional acrylic polyol, PPG automotive clearcoat
[5]CAB-531-1 and CAB-551- 0.01- cellulose acetate butyrate which is commercially available from Eastman Corporation
[6]TINUVIN 328 & TINUVIN 292, which is commercially available from CIBA Specialty Chemicals
[7]DiButylTinDilaurate, chemical accelerator
[8]BENTONE 34, AEROSIL 200 - suspending agents commercially available from Elementis Specialties & Degussa Corporation
[9]BAYSILONE OL17- flow control additive which is commercially available from Bayer Corporation
[10]Solvents from resin and additive solutions comprising predominantly n-butyl acetate, intermediate amounts of methyl ether propylene glycol acetate and SOLVESSO 100 aromatic solvent commercially available from ExxonMobil Chemical, and minor amounts of toluene, xylene and mineral spirits
[11]DISPERBYK 167 and ANTI-TERRA-U 100 - rheology modifiers commercially available from BYK Chemie
[12]Blended solvent comprising ethyl acetate (52.3 parts by weight), exempt high initial VM&P naptha (14.6 parts by weight), isopropyl alcohol (13.7 parts by weight), n-propoxypropanol (10.3 parts by weight), methyl ether propylene glycol acetate (8.4 parts by weight) and toluene (0.8 parts by weight)
[13]DESMODUR N-3300 - hexamethylene polyisocyanate which is commercially available from Bayer Corporation
[14]Solvent blend comprising SOLVESSO 100 aromatic solvent commercially available from ExxonMobil Chemical (39.8 parts by weight), xylene (31.7 parts by weight), methyl ether propylene glycol acetate (20.2 parts by weight) and n-butyl acetate (8.3 parts by weight) NCO/OH - (weight of isocyanate/equivalent weight)/(weight of polyester polyols/equivalent weight)

Components A and B were formed in a similar manner as the red coat formulation described in Example 2 and Table 2, except the ingredients were provided in the amounts listed above in Table 5. The coating was applied over EVA foam, synthetic leather, TPU and nylon substrates via a conventional Binks Model #7 gun at an atomization pressure of 60-70 psi. and low fluid flow. The coating was sprayed to cover each substrate to approximately 0.6 mils of film build thickness. A 10 minute flash at ambient temperature was preformed, followed by a thermal bake at 180° for 30 minutes (bake temperature dependent on type of flexible substrate). All coated substrates were conditioned at 72° F. and ambient humidity for 7 days prior testing to guarantee a fully cured coating.

The physical performances of various substrates coated with the coating compositions are shown in Table 6 for the coated EVA foam, synthetic leather and TPU substrates. The samples passed initial/final adhesion testing, 10 day humidity testing and flexibility testing over each type of flexible substrate: EVA foam, synthetic leather and thermoplastic polyurethane (TPU). According to the standard test method ASTM D3359 test method B, each of the coated substrates demonstrated a 5 classification on a scale of 0 to 5, indicating excellent adhesion onto the surface.

As shown in Table 6, standard 10-day humidity testing was performed (ASTM D2247-99). The same adhesion test method was utilized for final adhesion performance after 10 day 100% relative humidity exposure. The results indicated no coating loss on the surface of each substrate for both samples. Again, both samples of all five substrates passed adhesion with a 5 classification.

TABLE 6

Solvent-Based Color Harmonization Coating Adhesion Properties

|  | EVA Foam | Synthetic Leather | TPU |
| --- | --- | --- | --- |
| Initial Adhesion | 5B | 5B | 5B |
| Final Adhesion | 5B | 5B | 5B |
| Post-humidity Testing | 5B | 5B | 5B |

"B" refers to the test method B of ASTM Standard D3359- lattice pattern cut through coating to substrate, pressure-sensitive tape applied and quickly removed.
The numeric value represents adhesion measured on a scale of 0 to 5, with 5 showing no delamination and 0 showing 100% adhesion loss.
Initial adhesion - samples tested after cure
Final adhesion - after 7 day post-cure As shown in Table 7 a flexibility bend test was performed on the samples for the three substrates. After a seven day post-cure, the substrate was manually bent once to 180°. There were no indications of cracking or stripping of the coating from any substrate.

TABLE 7

Solvent-Based Color Harmonization Coating Flexibility Properties

|  | EVA Foam | Synthetic Leather | TPU |
| --- | --- | --- | --- |
| Flexibility Test | No cracking | No cracking | No cracking |

Samples tested seven days post-cure by manually bending to 180°.
Coating was checked for cracking along the bent area.

Figure 5:
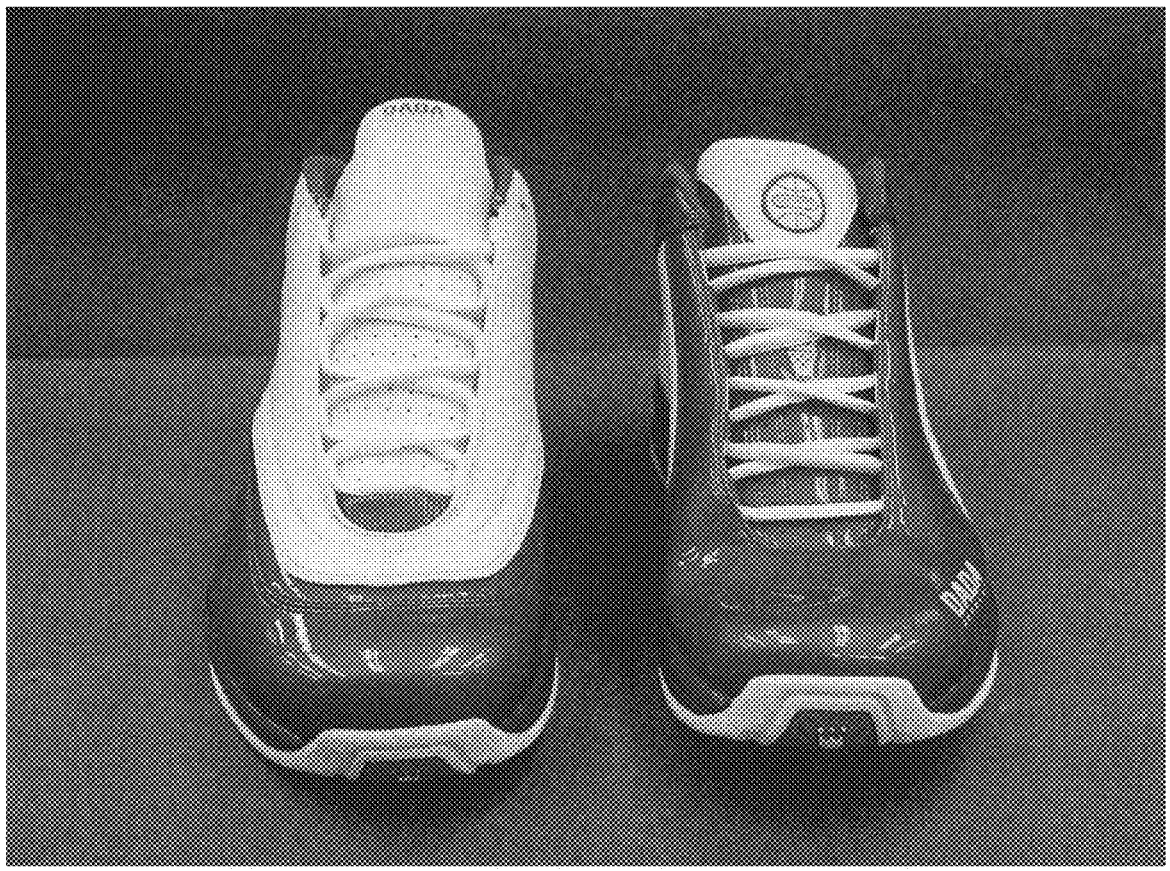
Figure 6:
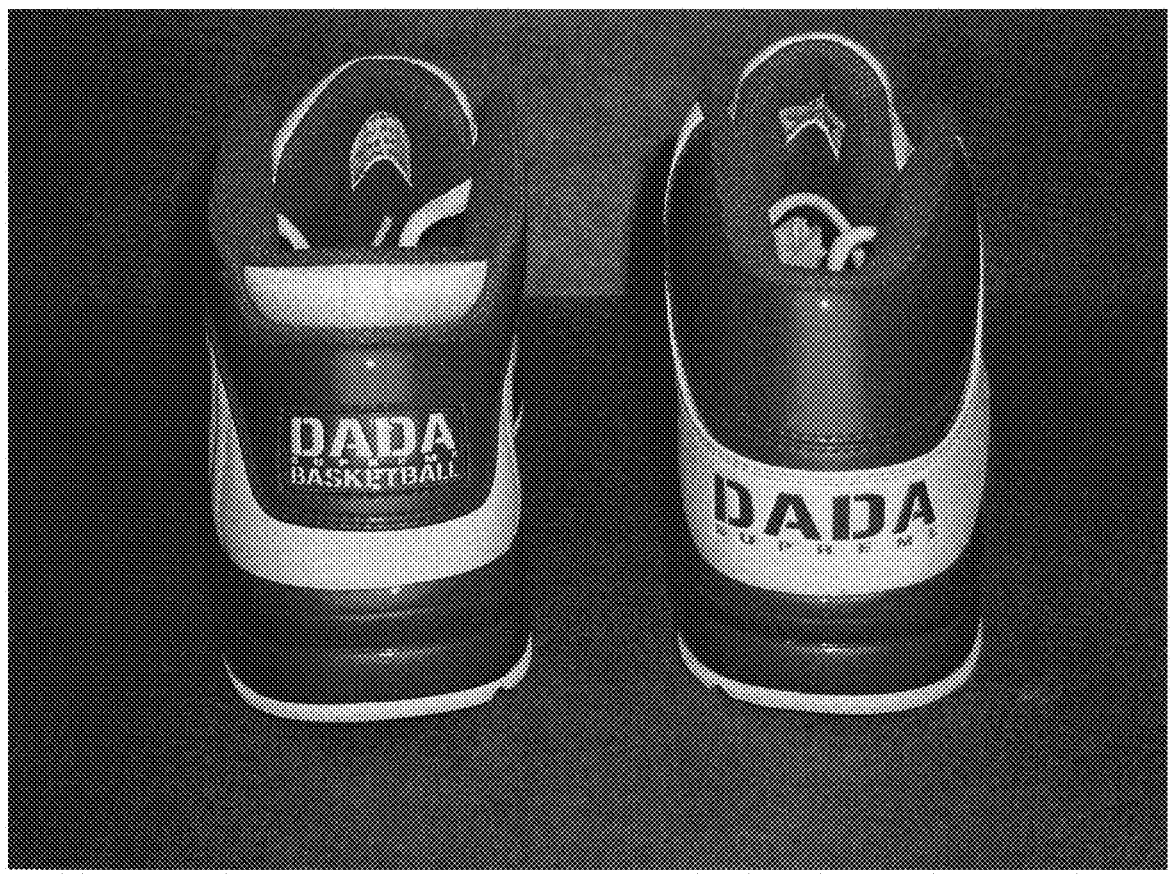
Figure 7:
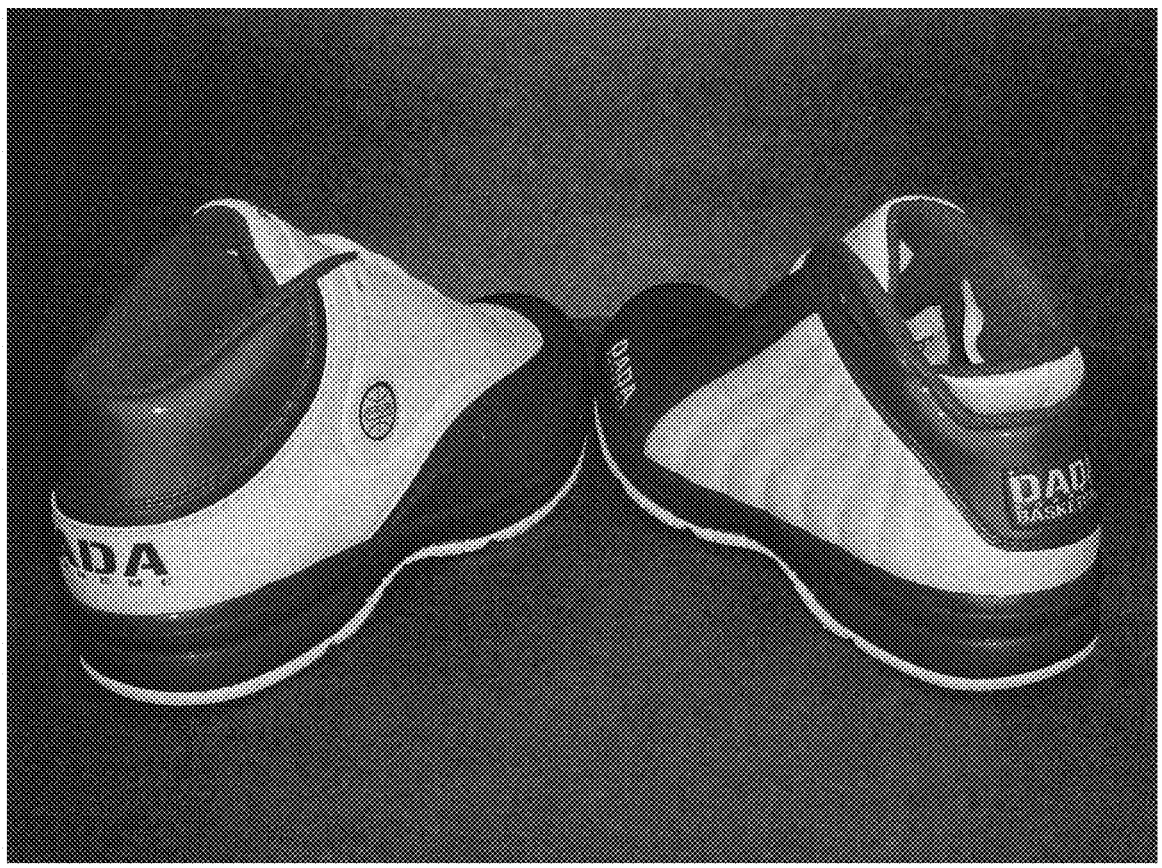

Coated substrates produced as described above were assembled into two styles of athletic shoes, as shown in the photographs of FIGS. 5-7. The midsole of each shoe comprises the coated EVA foam. The red upper components (toe, midsection and heel) comprise the coated synthetic leather. The heel insert (shown most clearly in the left shoe of FIG. 6) comprises the coated TPU. In addition, the right shoe shown in FIG. 7 includes a nylon eyelet coated with the color harmonization coating. As shown in FIGS. 5-7, excellent color harmonization is achieved.

Example 4

Sections of commercially available off-the-shelf athletic shoes were masked-off with tape. The sections of the EVA foam midsole, coated synthetic leather upper, and TPU upper were cleaned with isopropyl alcohol and coated with an aqueous coating comprising 53.33 grams of the aqueous polyurethane dispersion described in Example 1, 14.47 grams of commercially available CARBODILITE V02-L2 crosslinker from Nisshinbo Chemicals, 26.20 grams of OneSource 9292-T1467 white tint from PPG Industries, Inc., and 6.00 grams of deionized water in a beaker. The materials were blended with a low lift impeller blade attached to an air driven rotary stirrer. Mixing was performed for five minutes under low to medium speed. The mixture was filtered through 18 TXX polyester multifilament mesh into a clean receptacle and allowed to equilibrate. The coating was spray applied and cured according to the procedure of Example 1 to a dry film thickness of 1-2 mils. The shoes were wear tested for a period of 3 months on a nearly daily basis. The sections of the shoes that were coated with the color harmonization coating were visually cleaner than the un-coated sections. The coating maintained adhesion and coating integrity.

After three months of wear, one shoe was placed into a standard residential washing machine and washed with laundry detergent. The washed shoe also maintained coating integrity and adhesion in the coated sections. The coated sections of the washed shoe were visually cleaner than the coated sections of the unwashed shoe.

Figure 8:
Figure 9:

FIGS. 8 and 9 are photographs of the coated shoe in which the tabbed areas represent the portions of the shoe that were painted with the color harmonization coating. As can be seen from FIGS. 8 and 9, the painted areas exhibit good color harmonization after three months of wear.

Example 5

The EVA midsoles and leather uppers of two commercially available athletic shoes were coated with two different formulations of tinted polyurethane dispersions. The first formulation was produced by adding 10 g of aluminum tint paste under slow agitation to a premixture of 73 g of the polyurethane dispersion described in Example 1, and 17 g of carbodiimide.

The second formulation was produced by adding 50 g of blue nano-pigment dispersed polyurethane acrylic colorant to a premixture of 37.0 g of the polyurethane dispersion described in Example 1, and 9.0 g of carbodiimide. The blue nano-pigment dispersed acrylic colorant was produced by making a pre-emulsion by stirring charge A, as identified in Table 8, with a Cowles blade in a stainless steel beaker. The pre-emulsion was then recycled through a MICROFLUIDIZER M110T at 8,000 psi for 15 minutes and transferred to a four neck round bottom flask equipped with an overhead stirrer, condenser, electronic temperature probe, and a nitrogen atmosphere. Charge B, as identified in Table 8, was used to rinse the MICROFLUIDIZER and was added to the flask. The temperature of the microemulsion was adjusted to 30° C. The polymerization was initiated by adding charge C, as identified in Table 8, followed by a 30 minute addition of Charge D, also identified in Table 8. The temperature of the reaction increased to 56° C. The final pH of the latex was 7.24, the nonvolatile content was 35.9%, the Brookfield viscosity was 87 cps.

TABLE 8

Blue Nano-Pigment Dispersed Polyurethane Acrylic Coating

| Charge A | |
| --- | --- |
| Pigment Dispersion[1] including Acrylic[2] | 138.0 g |
| Polyurethane/urea Pre-polymer[3] | 428.6 g |
| Methyl methacrylate | 120.0 g |
| Monobutyl ether of propylene glycol | 90.0 g |

TABLE 8-continued

Blue Nano-Pigment Dispersed Polyurethane Acrylic Coating

| Charge B | |
|---|---|
| Water | 40.0 g |
| Charge C | |
| Sodium metabisulfite | 0.6 g |
| Ferrous ammonium sulfate | 0.1 g |
| Water | 10.0 g |
| Charge D | |
| 70% t-butyl hydroperoxide | 0.6 g |
| Water | 10.0 g |

The pigment dispersion denoted as footnote 1 in Table 8 was prepared by mixing 45.0 g of Acrylic 2, 473.0 g deionized water, 45.0 g of phthalo blue at 2% solid weight, and 1800.0 g glass beads having a mean diameter of 71 microns, commercially available from Potters Glass, Inc. The mixture was milled at 5,000 rpm for 6 hours. The progress of the milling was monitored by measuring the visible spectra of samples and observing the decrease in absorbance at a wavelength of 400 nm. During the course of the milling, 200 g of additional water was added as needed to offset the increasing viscosity of the mixture. The mixture was filtered through a 1 micron felt bag to remove the glass beads. The product has a nonvolatile content of 7.58%.

The acrylic denoted as footnote 2 in Table 8 was produced by mixing 20.0 g magnesol and 120.0 g toluene in a 2 liter flask with air-stirrer, thermocouple and azeotropic distillation set-up. The mixture was heated to reflux and water was azeotroped off. The mixture was then cooled and put under a nitrogen blanket. 7.5 g of 2,2'-dipyridyl and 6.1 g of copper (0) powder were added to the mixture while maintaining the nitrogen blanket. 30.4 g para-toluenesulfonyl chloride was also added to the mixture while maintaining the nitrogen blanket. 169.2 g benzylmathacrylate and 20.0 g glycidyl isopropyl ether were added to an addition funnel and sparged with nitrogen for 15 minutes prior to addition. The 169.2 g benzylmathacrylate and 20.0 g glycidyl isopropyl ether was then added to the reaction flask and the mixture was heated carefully to 70° C. When the solids reached 60.7%, 888.3 g MPEG (550) MA and 250.0 g toluene were charged to an addition funnel and sparged with nitrogen for 15 minutes. The 888.3 g MPEG(550)MA and 250.0 g toluene were then added to the reaction over 30 minutes while maintaining a 70° C. reaction temperature. The reaction was heated for 6 hours and then cooled and stirred overnight under a nitrogen blanket. The reaction mixture was thinner with 500 g of toluene and then filtered through a cake of magnesol to remove the residual catalyst. The solvent was removed under vacuum yielding a resin at 98.4% solids.

The polyurethane/urea pre-polymer denoted as footnote 3 in Table 8 was produced in a four neck round bottom flask equipped with an electronic temperature probe, mechanical stirrer, condenser, and a heating mantle. 269.8 g N-methylpyrrolidinone, 91.1 g hydroxyethyl methacrylate (HEMA), 234.7 g dimethylolpropionic acid (DMPA), 2.2 g triphenyl phosphite, 2.2 g dibutyltin dilaurate and 2.2 g butylated hydroxytoluene were stirred in the flask at a temperature of 100° C. until all solids were dissolved. 700.0 g poly(butylene oxide) having a number average molecular weight of 1000 was added and the mixture was cooled to 70° C. 1,100.4 g 4,4'-methylenebis(cyclohexyl isocyanate) was added over a 15 minute period. 481.8 g butyl methacrylate was used to rinse the addition funnel containing the isocyanate and the temperature of the mixture was then held at 90° C. for an additional 3 hours. 642.5 g butyl acrylate was added over a ten minute period. The resulting composition was identified as Charge A. In a separate flask, 4,263.3 g water, 124.7 g dimethylethanolamine, 73.6 g diethanolamine and 42.1 g ethylenediamine were heater to 60° C. The resulting composition was identified as Charge B. Charge A was added to Charge B and the resulting mixture was cooled to room temperature. The final product was a white emulsion with an acid value of 15.2, a Brookfield viscosity of 800 centipoise, a pH of 7.37, and a nonvolatile content of 28.4%.

Each of the formulations was spray applied and cured to the EVA foam midsoles and leather uppers, as described in Example 1, and evaluated to determine adhesion and blistering as shown in Table 9.

TABLE 9

| Formulation | Shoe Substrate | Initial Adhesion | Post Humidity 10 Days Adhesion/ Blistering |
|---|---|---|---|
| Aluminum Tint Paste Formulation | EVA foam midsole | 5 | 5/no blistering |
| Aluminum Tint Paste Formulation | Leather Upper | 5 | 3/moderate blistering |
| Blue Nano-Pigment Dispersed Polyurethane Acrylic | EVA foam midsole | 5 | 5/no blistering |
| Blue Nano-Pigment Dispersed Polyurethane Acrylic | Leather Upper | 3 | 1/slight blistering |

As shown in Table 9, the EVA foam midsoles and leather uppers were then tested to determine the initial adhesion according to ASTM D3359. The EVA foam exhibited a 5 initial adhesion on a scale of 1-5, showing no pick-off and 100% adhesion. The leather uppers had some blistering and delamination on some portions of the leather uppers, however, results for the aluminum tint paste leather upper was within industrial footwear cross-hatch adhesion test specifications, where a 3-5 is passing on a scale of 1-5.

Also shown in Table 9, the coatings were also applied to EVA foam and leather uppers and subjected to 100% relative humidity at 100° F. for 10 days and tested to determine post humidity adhesion and post humidity blistering according to ASTM D714. The EVA foam midsoles exhibited a 5 on a scale of 1-5 for post humidity adhesion, showing no pick-off and 100% adhesion. The EVA foam exhibited no blistering. The leather uppers exhibited poorer post humidity adhesion with some blistering.

Example 6

A coating composition was made by mixing 47.49 g of the polyurethane dispersion of Example 2 with 12.40 g CARBODILITE V02-L2, and 40.11 g of photochromic urethane acrylate in a beaker. The photochromic urethane acrylate was produced by adding the ingredients shown in Table 10 in the order described to a four neck round bottom flask equipped with an electronic temperature probe, mechanical stirrer, condenser and a heating mantle.

TABLE 10

| Photochromic urethane acrylate | |
|---|---|
| Charge A | |
| Toluene | 18.33 g |
| Blue Photochromic dye[1] | 3.03 g |

TABLE 10-continued

| Photochromic urethane acrylate | |
|---|---|
| Dibutyltin dilaurate | 0.01 g |
| Butylated hydroxytoluene | 0.01 g |
| Charge B | |
| Composition D[2] | 6.6 g |
| Charge C | |
| Composition E[3] | 2.69 g |
| Charge D | |
| Toluene | 4.0 g |

[1]Blue photochromic dye 3,3-di(4-methoxyphenyl)-6,11,13-trimethyl-13-(2-(2-(2-hydroxyethoxy)ethoxy)ethoxy)-3H,13H-indeno[2,1-f]naphthp[1,2-b]pyran
[2]2-heptyl-3,4-bis(9-isocyanatonyl)-1-pentyl-cyclohexane
[3]2-(dicaprolactone)ethyl acrylate Charge A was stirred in the flask and heated to a temperature of 90° C. for 30 minutes. Charge B was added to the mixture and the mixture was held at 90° C. for 60 minutes. Charges C and D were added and the mixture was held at 90° C. for 30 minutes. The photochromic urethane acrylate was a dark blue liquid with a nonvolatile content of 53.4%, measured at 110° C. for one hour.

The final composition was blended with a low lift impeller blade attached to an air driven rotary stirrer. The polyurethane dispersion and carbodiimide were blended as a 40:60 ratio. Mixing was performed for five minutes under low to medium speed. The mixture was filtered through 18 TXX polyester multifilament mesh into a clean receptacle.

The coating composition was spray applied to EVA foam substrates as described in Example 1. The coated substrates exhibited good adhesion and acceptable fade-back when an applied light source was removed from the coating.

Another coating composition comprising the same polyurethane dispersion and CARBODILITE V02-L2 was prepared by the same method described above using a red photochromic urethane acrylate. The photochromic dye was produced by adding the ingredients identified in Table 11 to a four neck round bottom flask equipped with an electronic temperature probe, mechanical stirrer, condenser, and a heating mantle.

TABLE 11

| Red Photochromic Urethane Acrylate | |
|---|---|
| Charge A | |
| Toluene | 22.71 g |
| Red Photochromic Dye[1] | 4.29 g |
| Dibutyltin dilaurate | 0.02 g |
| Butylated hydroxytoluene | 0.02 g |
| Charge B | |
| 2-heptyl-3,4-bis(9-isocyanatononyl)-1-pentyl-cyclohexane | 11.32 g |
| Charge C | |
| Hydroxyethyl acrylate | 2.69 g |
| 2-ethylhexanol | 1.00 g |
| Charge D | |
| Toluene | 4.0 g |

[1]Red Photochromic Dye 2,2-di-(4-methoxyphenyl)-5-methoxycarbonyl-6-(2-(2-hydroxy)ethoxy)ethoxy-2H-naphthol[1,2-b]pyran Charge A was stirred in the flask and heated to a temperature of 90° C. Charge B was added and the mixture was held at 80° C. for 60 minutes. Charge C was added and the mixture was held at 80° C. for 30 minutes. The Red Photochromic Urethane Acrylate was a dark red liquid with a nonvolatile content of 43.8%.

The red photochromic urethane acrylate composition was blended according to a 55:15:30 weight ratio of polyurethane dispersion:carbodiimide crosslinker:red photochromic urethane acrylate colorant. The resulting red photochromic composition was spin-coated on action leather substrate. Appearance and photo-activation were excellent.

Although the colorants of the two coating compositions of this example were different, the base composition was substantially similar. Identical colorants could alternatively be used in the same base coating with excellent mechanical and visual properties on different substrates.

Example 7

Figure 10:
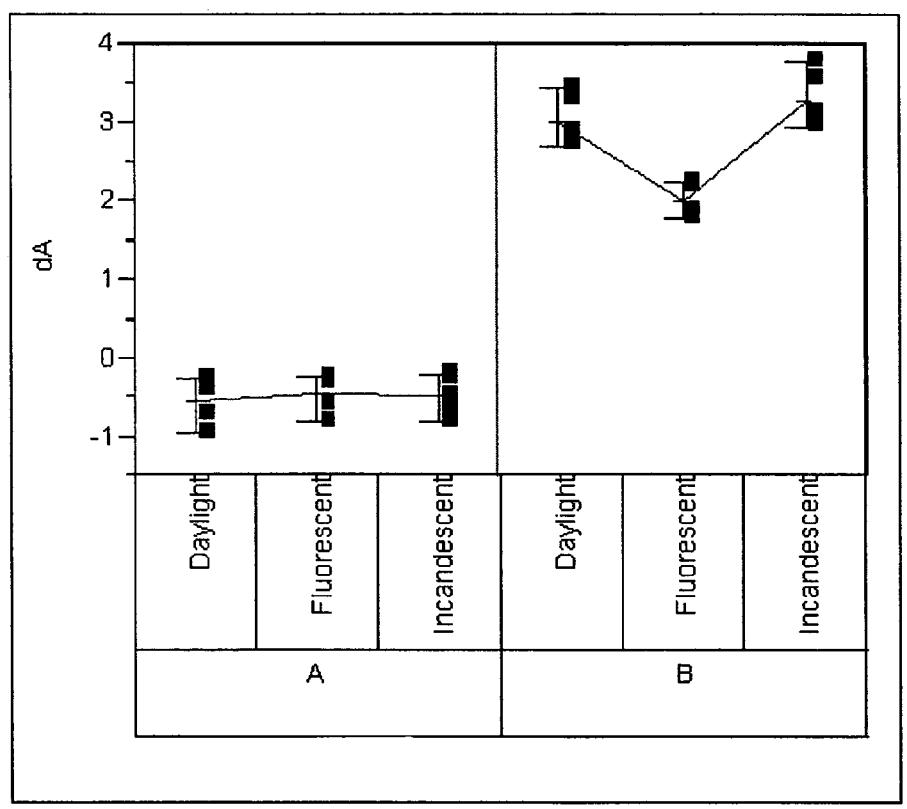
FIG. 10 is a color variability chart showing substantially uniform color characteristics for a color harmonization coating of the present invention under different lighting conditions and substrates versus conditional or metameric color characteristics for conventional color matched coating compositions under different lighting conditions and substrates.

This example demonstrates relative color change among different systems (ASTM D2244-93) depending on the light source. System "A" is a comparison of the red footwear coating described in Example 3 on synthetic leather (uppers) and the same coating on EVA foam material (midsole). System B is a comparison of two different color match formulations on two different substrates: an Envirobase 5502 color match coating on synthetic leather; and a Global 5502 color match coating on EVA foam. The two different 5502 coatings were color matched to achieve the same color. Six different combinations (two systems×3 lighting sources) were measured five times each to demonstrate that the observed change in relative color is not simply a function of measurement variation. In this example all of the coatings were applied via spray application. Delta a (Δa), delta b (Δb), delta E (ΔE) and delta L (ΔL) properties were measured on a Minolta Spectrophotometer CM-3600d according to CIELAB standards. For example, Δa is a measure of degree to which the specimen looks red or green. The results are shown in Table 12, and are graphically illustrated in FIG. 10. In System B, with two different "color matched" coatings, the Δa color match varied depending on the light source. More specifically, the color of each coating as read by the spectrophotometer is closer under fluorescent light than under daylight or incandescent light. This demonstrated one of the problems associated with color matching. However, for system A, where the same coating is on both substrates, the color read by the spectrophotometer is substantially the same under all lighting sources.

TABLE 12

| System | Lighting | Mean (Δa) | Mean (Δb) | Mean (ΔE) | Mean (ΔL) |
|---|---|---|---|---|---|
| A | Daylight | −0.538 | −0.284 | 0.636 | −0.078 |
| A | Fluorescent | −0.448 | −0.258 | 0.558 | −0.072 |
| A | Incandescent | −0.484 | −0.43 | 0.684 | −0.156 |
| B | Daylight | 3.014 | 1.248 | 3.304 | 0.65 |
| B | Fluorescent | 1.984 | 1.066 | 2.316 | 0.57 |
| B | Incandescent | 3.292 | 2.074 | 4.05 | 1.118 |

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. As used herein, the singular forms of "a", "an" and "the" can include plural referents. Accordingly, while the invention may be described in terms of "a" particular ingredient, component, etc., such as "a" polyurethane dispersion, "a" colorant, and the like, more than one ingredient, component, etc. may be used. Also, as used herein, the term "polymer" is meant to refer to prepolymers, oligomers and both homopolymers and copolymers; the prefix "poly" refers to two or more.

Whereas particular embodiments of this invention have been described above for purposes of illustration, it will be evident to those skilled in the art that numerous variations of the details of the present invention may be made without departing from the invention as defined in the appended claims.

What is claimed is:

1. An article of manufacture comprising:
a first substrate comprising a first flexible material;
a second substrate comprising a second material different from the first material; and
a color harmonization coating covering at least a portion of the exterior of the first substrate and at least a portion of the exterior of the second substrate, such that the color harmonization coating is visible on at least a portion of the exterior of the first and second substrates on the article of manufacture.

2. The article of manufacture of claim 1, wherein the second substrate comprises a flexible material.

3. The article of manufacture of claim 1, wherein the first and second substrates comprise natural leather, synthetic leather, vinyl, nylon, thermoplastic urethane, fabric, foam and/or rubber.

4. The article of manufacture of claim 1, wherein the first substrate comprises natural leather and the second substrate comprises synthetic leather.

5. The article of manufacture of claim 1, wherein the first substrate comprises foam and the second substrate comprises natural leather and/or synthetic leather.

6. The article of manufacture of claim 1, wherein the color harmonization coating is an aqueous coating.

7. The article of manufacture of claim 1, wherein the color harmonization coating is a solvent based coating.

8. The article of manufacture of claim 1, wherein the color harmonization coating comprises a colorant.

9. The article of manufacture of claim 8, wherein the colorant comprises a special effect composition.

10. The article of manufacture of claim 9, wherein the special effect composition comprises a photosensitive composition and/or a photochromic composition.

11. The article of manufacture of claim 10, wherein the photosensitive composition and/or photochromic composition is associated with a polymer and/or polymeric material of a polymerizable component.

12. The article of manufacture of claim 10, wherein the photosensitive composition and/or photochromic composition is at least partially bound to a polymer and/or polymeric material of a polymerizable component.

13. The article of manufacture of claim 8, wherein the colorant produces a metallic sheen.

14. The article of manufacture of claim 1, wherein the color harmonization coating comprises a texture-enhancer.

15. The article of manufacture of claim 1, wherein the article of manufacture is footwear.

16. The article of manufacture of claim 15, wherein the footwear is an athletic shoe.

17. Footwear comprising:
a first substrate comprising a first flexible material;
a second substrate comprising a second flexible material different from the first flexible material; and
a color harmonization coating covering at least a portion of the exterior of the first substrate and at least a portion of the exterior of the second substrate, such that the color harmonization coating is visible on at least a portion of the exterior of the first and second substrates on the footwear.

18. An article of manufacture comprising:
a first substrate comprising foam;
a second substrate; and
a color harmonization coating covering at least a portion of the exterior of the first substrate and at least a portion of the exterior of the second substrate, such that the color harmonization coating is visible on at least a portion of the exterior of the first and second substrates on the article of manufacture.

19. The article of manufacture of claim 18, wherein the article of manufacture is footwear.

20. The article of manufacture of claim 18, wherein the article of manufacture is a footwear component.

21. The article of manufacture of claim 18, wherein the first substrate comprises olefinic foam.

22. The article of manufacture of claim 21, wherein the olefinic foam comprises ethylene vinyl acetate.

23. The article of manufacture of claim 18, wherein the second substrate comprises natural leather, synthetic leather, vinyl, nylon, thermoplastic urethane, fabric, foam and/or rubber.

24. Footwear comprising:
a first substrate comprising foam;
a second substrate; and
a color harmonization coating covering at least a portion of the exterior of the first substrate and at least a portion of the exterior of the second substrate, such that the color harmonization coating is visible on at least a portion of the exterior of the first and second substrates on the footwear.

25. A method of making an article of manufacture including first and second flexible substrates of different materials, the method comprising:
coating at least a portion of the first flexible substrate with a color harmonization coating composition; and
coating at least a portion of the second flexible substrate with the color harmonization coating composition.

26. The method of claim 25, further comprising assembling the first and second flexible substrates together after the color harmonization coating is applied to the substrates.

27. The method of claim 25, further comprising assembling the first and second flexible substrates together before the color harmonization coating is applied to the substrates.

28. The method of claim 25, wherein the first and second substrates comprise natural leather, synthetic leather, vinyl, nylon, thermoplastic urethane, fabric, foam and/or rubber.

29. The method of claim 25, wherein the first substrate comprises natural leather and the second substrate comprises synthetic leather.

30. The method of claim 25, wherein the first substrate comprises foam and the second substrate comprises natural leather and/or synthetic leather.

31. The method of claim 25, wherein the color harmonization coating composition comprises a colorant and an aqueous resin dispersion.

32. The method of claim 31, wherein the resin of the aqueous resin dispersion comprises polyurethane.

33. The method of claim 25, wherein the color harmonization coating composition comprises a colorant and a solvent based resin dispersion.

34. The method of claim 33, wherein the resin of the solvent based resin dispersion comprises polyurethane.

35. The method of claim 25, wherein the color harmonization coating comprises a colorant.

36. The method of claim 35, wherein the colorant comprises a special effect composition.

37. The method of claim 36, wherein the special effect composition comprises a photosensitive composition and/or a photochromic composition.

38. The method of claim 35, wherein the colorant produces a metallic sheen.

39. The method of claim 25, wherein the color harmonization coating comprises a texture-enhancer.

40. The method of claim 25, wherein the article of manufacture is footwear.

41. The method of claim 40, wherein the footwear is an athletic shoe.

42. A method of making footwear including first and second flexible substrates of different materials, the method comprising:
   coating a least a portion of the first flexible substrate with a color harmonization coating composition; and
   coating at least a portion of the second flexible substrate with the color harmonization coating composition.

* * * * *